US006170518B1

(12) United States Patent
Ratelle

(10) Patent No.: US 6,170,518 B1
(45) Date of Patent: Jan. 9, 2001

(54) APPARATUS FOR HOLDING AND TRANSPORTING HIGH PRESSURE RESCUE AIR BAG SYSTEM COMPONENTS

(76) Inventor: James L. Ratelle, 555 Vine Hill Way, Martinez, CA (US) 94553

(*) Notice: Under 35 U.S.C. 154(b), the term of this patent shall be extended for 0 days.

(21) Appl. No.: 09/542,360

(22) Filed: Apr. 4, 2000

(51) Int. Cl.[7] .................................................... F16K 37/00

(52) U.S. Cl. .......................... 137/376; 137/343; 137/382; 248/154; 248/313

(58) Field of Search .................................... 137/343, 376, 137/382; 128/205.24; 248/154, 313

(56) References Cited

U.S. PATENT DOCUMENTS

| | | | |
|---|---|---|---|
| 3,791,403 | 2/1974 | Folkerth | 137/343 |
| 4,168,007 | 9/1979 | Rohatensky | 248/154 |
| 4,486,044 * | 12/1984 | Gordon et al. | 294/31.2 |
| 4,788,973 | 12/1988 | Kirchgeorg et al. | 128/214.18 |
| 4,944,292 | 7/1990 | Gaeke et al. | 137/343 |
| 5,086,804 * | 2/1992 | Ngai | 137/312 |
| 5,396,885 | 3/1995 | Nelson | 137/343 |

OTHER PUBLICATIONS

Working Air Cast Made Available by Paratech Incorporated of Frankford, Illinois, Air Source C.A.R.T made available by Interspiro U.S., Incorporated of Branford, Conn., 1999.

The Walkaway Bracket Made Available by Ziamatic Corporation (also known as Zico) of Yardley, Pennsylvania, 1999.

* cited by examiner

*Primary Examiner*—A. Michael Chambers
(74) *Attorney, Agent, or Firm*—Thomas R. Lampe

(57) ABSTRACT

Apparatus for holding and transporting high pressure rescue air bag system components includes a rigid framework having a base member and a stanchion extending upwardly from the base member. The apparatus incorporates structure which releasably retains the deadman switch, the high pressure regulator and regulator gauge and high pressure air bottle of the system in place for transport by an individual.

20 Claims, 4 Drawing Sheets

APPARATUS FOR HOLDING AND TRANSPORTING HIGH PRESSURE RESCUE AIR BAG SYSTEM COMPONENTS

TECHNICAL FIELD

This invention relates to apparatus that is used to hold components of a high pressure rescue air bag system so that the components may be readily transported to a desired location as a unit carried by an individual.

BACKGROUND OF THE INVENTION

High pressure air bags are well known devices for use in rescue situations, such bags being employed, when inflated by high pressure air, to lift or separate structures. A common application is to lift a structure to facilitate or enable removal of a person involved in an accident. The terms "rescue air bag" and "rescue air bag system" refer to any air bag or air bag system which is utilized to lift or move structures, including but not limited to rescue situations.

A number of components are employed in a high pressure rescue air bag system. In addition to the bag itself, the system typically includes a high pressure bottle for providing pressurized air or possibly other gas, a high pressure regulator with associated regulator gauge, a high pressure air line extending between the valve/connector of the bottle and the high pressure regulator, and a deadman switch which is associated with another high pressure line extending between the high pressure regulator and the air bag to control flow of high pressure air to the air bag.

The apparatus of the present invention is utilized to releasably hold the bottle, regulator and regulator gauge, high pressure air line extending between the regulator and the bottle, and a deadman switch. The bottle, regulator and regulator valve and air line are maintained in positions of use so that setup at a work site is facilitated. The deadman switch is readily positionable for use upon removal from the apparatus.

Prior art devices are known which are utilized to transport high pressure bottles equipped with high pressure regulators and multi-outlet high pressure manifolds with male and female couplings. Examples of these devices are a working air cart made available by Paratech Incorporated of Frankford, Illinois and the Air Source C.A.R.T. (continuous air resource transport) made available by Interspiro U.S., Incorporated of Branford, Conn. It is also a well known practice to carry a high pressure bottle on one's back. The Walkaway bracket made available by Ziamatic Corporation (also known as Zico) of Yardley, Pa. is employed to store an SCBA unit for accessability.

Related devices are disclosed in the following United States patents: U.S. Pat. No. 5,396,885, U.S. Pat. No. 4,168,0078, U.S. Pat. No. 4,788,973, U.S. Pat. No. 3,791,403, and U.S. Pat. No. 4,944,292.

None of the patents or other prior art indicated above teach or suggest the combination of structural elements disclosed and claimed herein.

DISCLOSURE OF INVENTION

This invention relates to apparatus for holding and transporting high pressure rescue air bag system components. As mentioned above, the terms "rescue air bag" and "rescue air bag system" encompass any airlift bag and airlift bag system whether or not actually employed in a rescue operation.

The apparatus includes a framework of rigid, unitary construction including a base member and an elongated stanchion attached to and extending upwardly from the base member.

The apparatus includes deadman switch retainer means for releasably retaining the deadman switch of a high pressure rescue air bag system on the framework at a first location. The apparatus further includes high pressure regulator and regulator gauge retainer means for releasably retaining the high pressure regulator and regulator gauge of a high pressure rescue air bag system on the framework at a second location.

High pressure air bottle retainer means is provided for releasably retaining the high pressure air bottle of a high pressure rescue air bag system on the framework at a third location. The apparatus and the equipment held thereby can readily be carried as a unit by one or more handles associated therewith. The apparatus is compact and may be deployed and used in tight quarters.

Other features, advantages, and objects of the present invention will become apparent with reference to the following description and accompanying drawings.

BEST MODE FOR CARRYING OUT THE INVENTION

Figure 1:
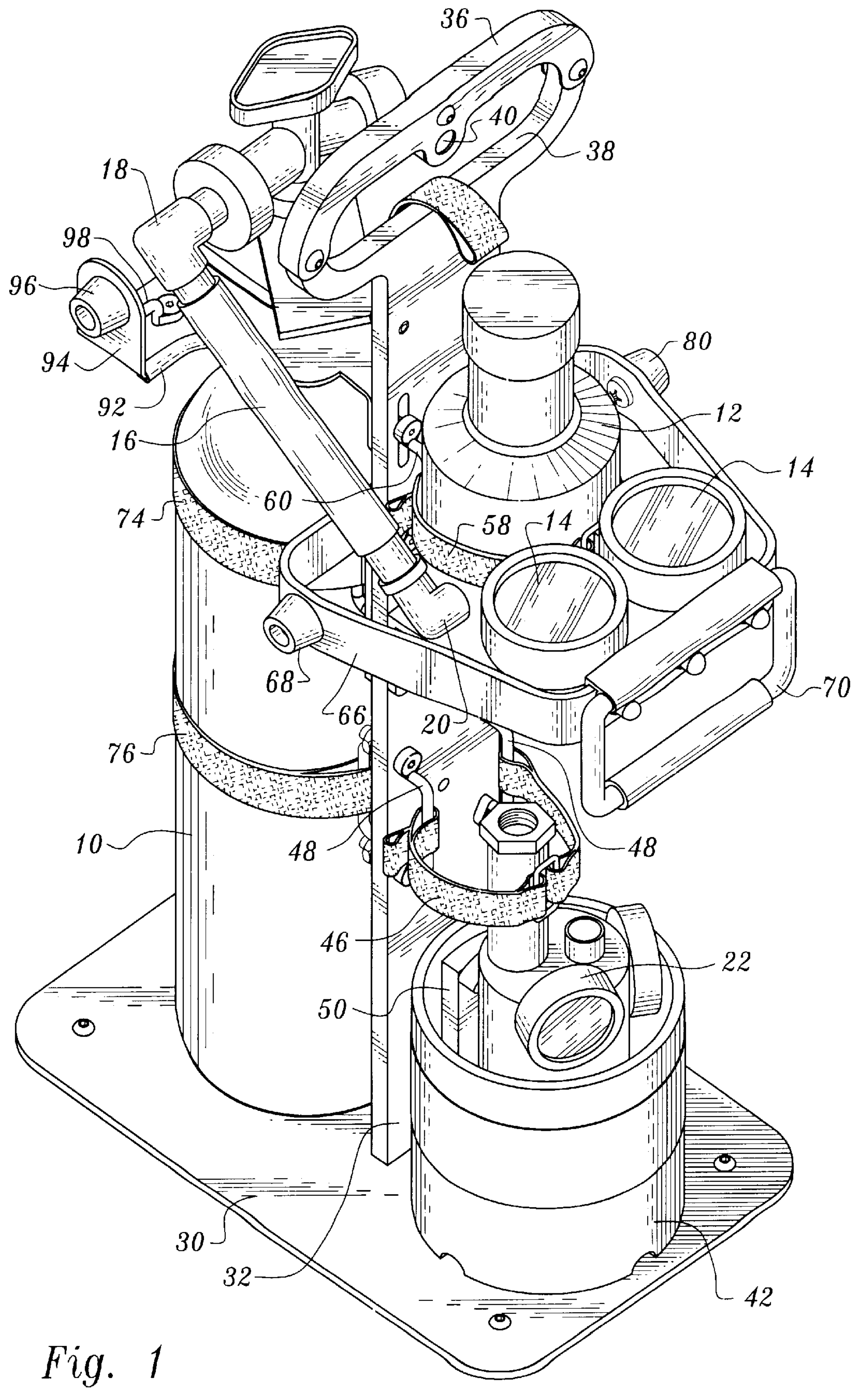
FIG. 1 is a perspective view illustrating a preferred form of apparatus constructed in accordance with the teachings of the present invention holding high pressure rescue air bag system components.
Figure 4:
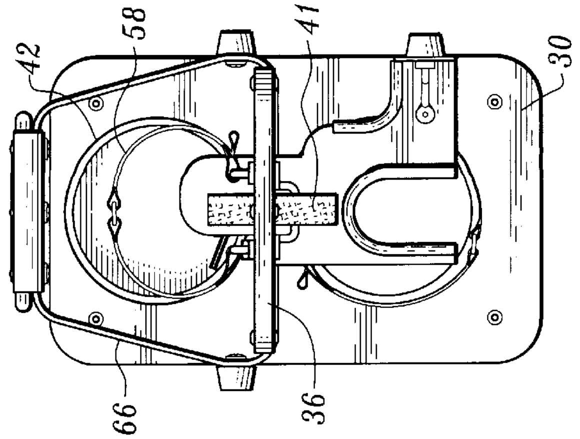
FIG. 4 is a top plan view of the apparatus.
Figure 3:
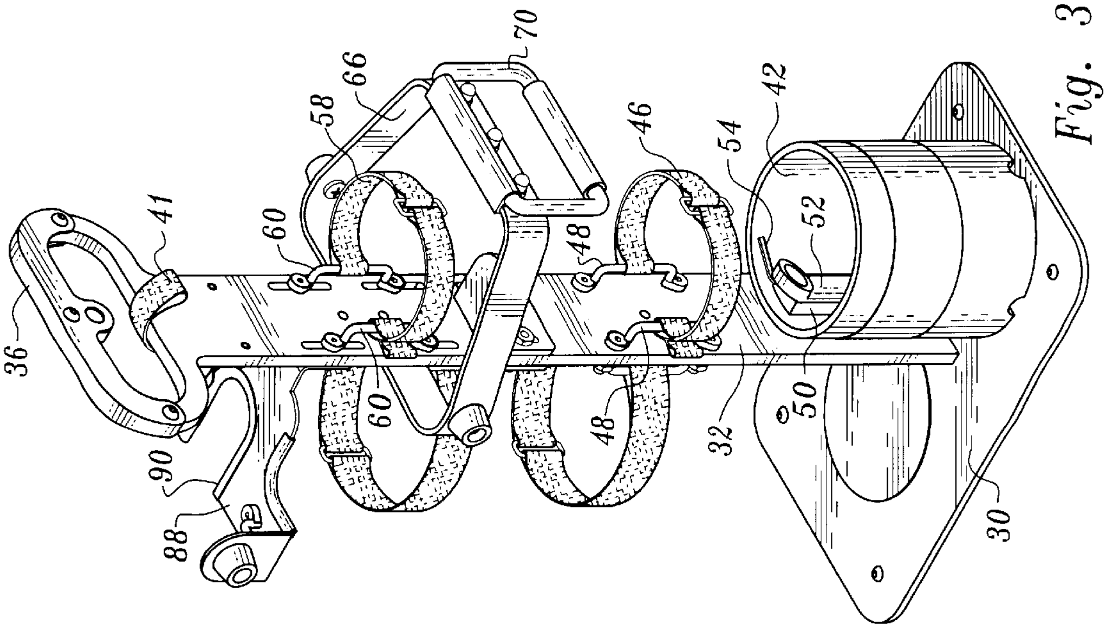
FIG. 3 is a frontal perspective view of the apparatus without the components.
Figure 2:
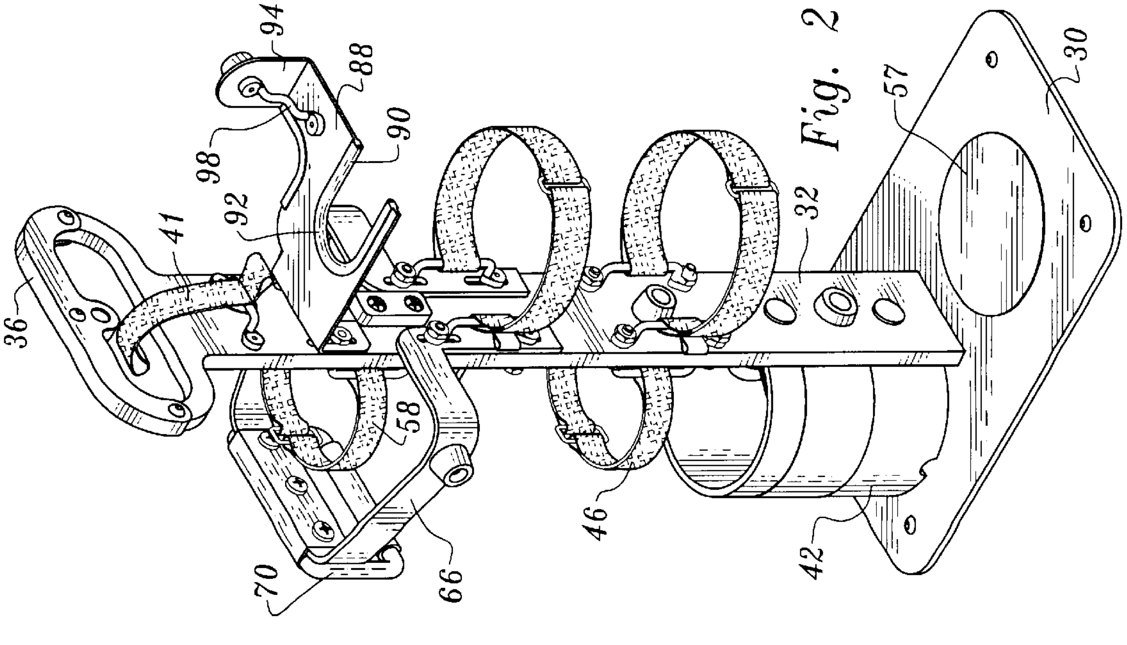
FIG. 2 is a rear perspective view of the apparatus without the components.
Figure 7:
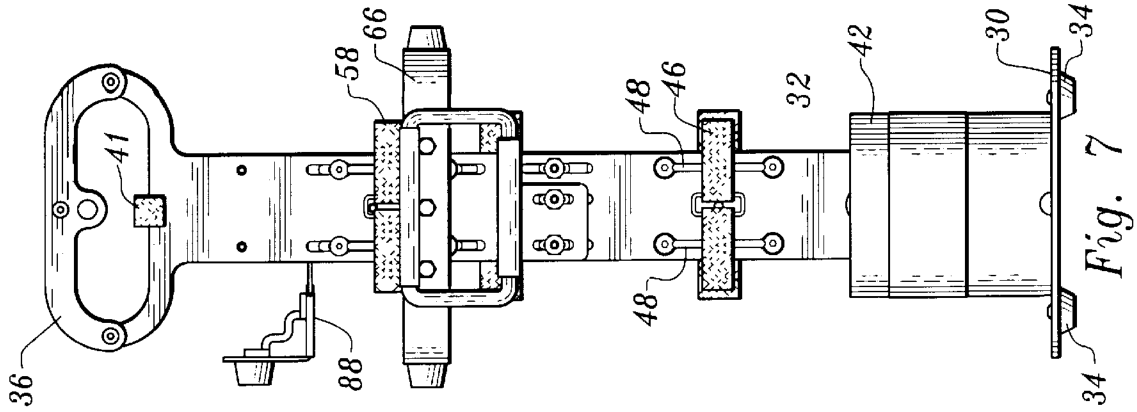
FIG. 7 is a front elevation view of the apparatus.
Figure 6:
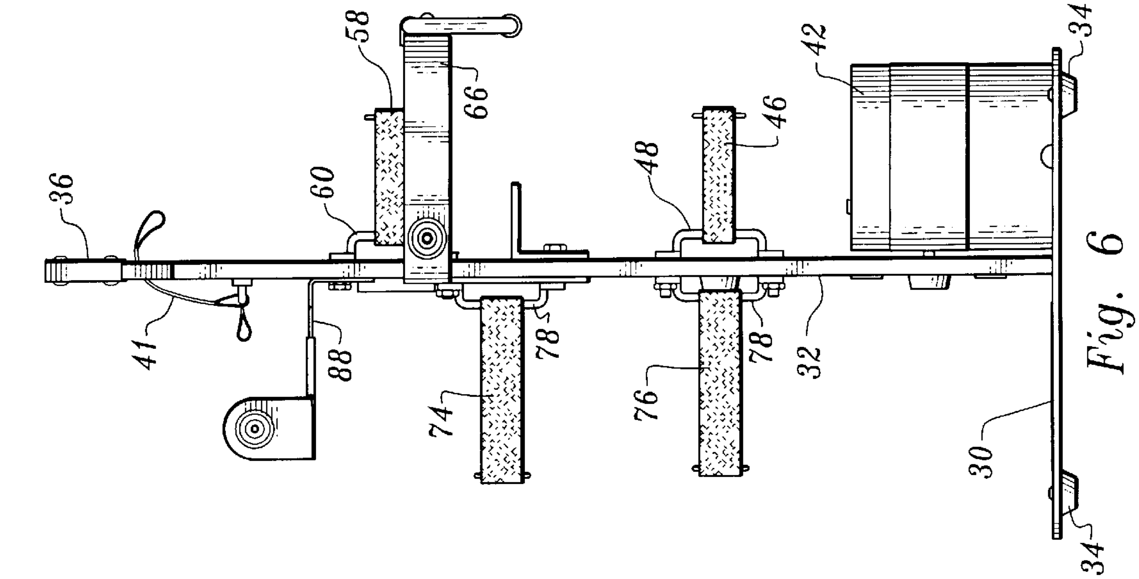
FIG. 6 is a side elevation view of the apparatus.
Figure 5:
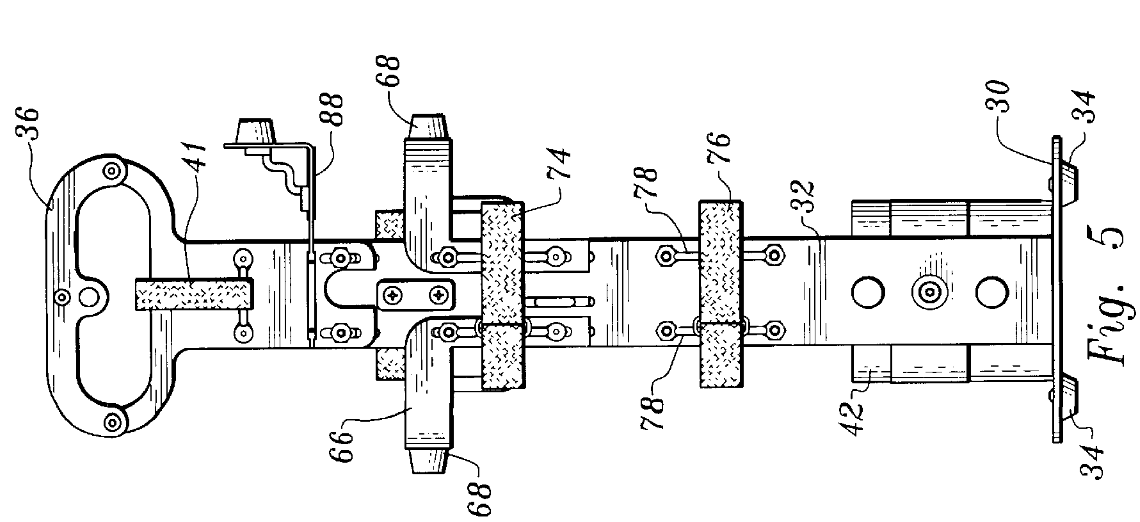
FIG. 5 is a rear elevation view of the apparatus.
Figure 8:
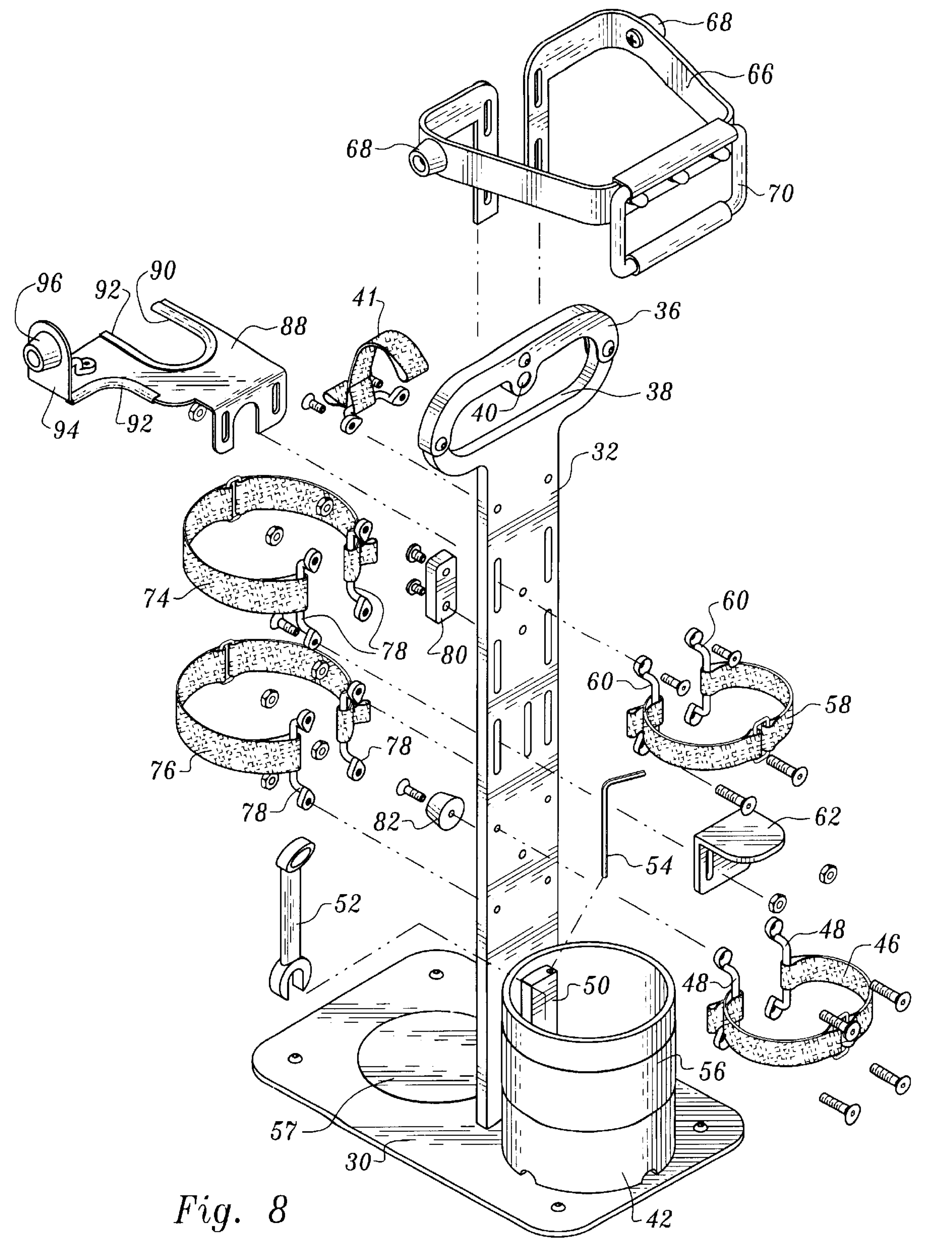
FIG. 8 is an exploded, perspective view of the apparatus.

Referring now to the drawings, FIG. 1 illustrates apparatus constructed in accordance with the teachings of the present invention employed to hold components of a high pressure rescue air bag system, namely, a high pressure air bottle 10, a high pressure regulator 12 with regulator gauges 14, a high pressure air line 16 connected by couplers 18, 20 to the air bottle and regulator respectively, and a deadman switch 22. It will be appreciated that the high pressure rescue air bag system components just described are commercially available and in widespread usage in high pressure rescue air bag systems.

The apparatus includes a framework of rigid, unitary construction including a base member 30 in the form of a plate constructed of aluminum or other suitable material and an elongated stanchion 32 attached to and extending upwardly from the base member, the stanchion also being constructed of any suitable material such as aluminum. Any suitable means may be employed to connect the stanchion and base member. Feet in the form of rubber bumpers 34 are secured to the bottom of the base member, as by means of screws.

The upper distal end of the stanchion 32 terminates at a handle 36 defining a hand opening 38 and an auxiliary opening 40. Opening 40 may be utilized to attach a rope or line to the apparatus so that it can be lowered or lifted. Due to its compact configuration the apparatus and the components carried thereby can enter close quarters and relatively little space is taken up during storage. A strap 41 formed of nylon webbing or the like is secured by a bracket to the stanchion below hand opening 38 to provide another means by which to support or maneuver the apparatus.

A receptacle 42 formed of aluminum or the like and having a cylindrically shaped configuration is attached to base member 30 on one side of stanchion 32, the receptacle having an open top end for receiving deadman switch 22. (FIG. 1). In use the deadman switch will be removed from the receptacle and employed in a high pressure line (not shown) extending from regulator 12 to a high pressure rescue air bag (not shown) in a conventional manner. In other words, the deadman switch is not held by the apparatus when in use, as compared to the air bottle, regulator, regulator gauges and connector air line 16, which stay in place during both transport and use.

An adjustable securement strap 46 is attached to stanchion 32 by brackets 48. Securement strap 46 is tightened about the upper end of the deadman switch to keep the switch from falling out of the receptacle 42 or moving relative to the receptacle.

In the arrangement illustrated, receptacle 42 has disposed therein a magnet 50 which can be used to retain tools such as wrench 52 and alien wrench 54 in the receptacle when the tools are not being employed. The receptacle 42 and the base member and stanchion of the framework as well as other components of the apparatus may be coated with a flourescent orange coating. In addition, reflective tape may be applied at suitable locations. In the illustrated arrangement, reflective tape 56 is wrapped about receptacle 42 and a patch of reflective tape 57 is applied to base member 30, for example.

Disposed above strap 46 and receptacle 42 is a high pressure regulator securement strap 58 which is mounted on stanchion 32 by brackets 60 by suitable mechanical fasteners such as bolts and screws, the fasteners being positioned in vertical slots formed in the stanchion. The securement strap may be selectively tightened or loosened and it is movable up and down on the brackets 60. The brackets 60 themselves may be moved up or down on the stanchion before being secured into position due to the fact that the mechanical fasteners employed to fasten the brackets 60 in place are disposed in the slots in the stanchion.

A support member 62 is located under securement strap 58 and is attached to the stanchion by mechanical fasteners in the form of nuts and bolts. The bolts pass through vertical slots formed not only in the stanchion but also in the vertical leg of the support member itself. This enables the horizontal leg of the support member to be adjustably moved up or down relative to the stanchion before securement of the support member to the stanchion takes place. The lower end of the high pressure regulator 12 (FIG. 1) rests on the horizontal leg of the support member.

A guard member 66 in the form of a rigid band of material such as aluminum is attached to stanchion 32. The guard member 66 has slots formed therein which communicate with slots in the stanchion. Bolts pass through the communicating slots and enable the guard member to be adjusted up or down relative to the stanchion prior to securing the stanchion in place. The guard member 66 projects over the base member and defines a guard member interior accommodating the high pressure regulator and regulator gauges when the securement strap 58 and support member 62 retain the regulator valve and gauges in place as shown in FIG. 1. The guard member protects the regulator and gauges from harm by impact. The illustrated embodiment of the invention incorporates rubber bumpers 68 at the side extremities of the guard member to provide further protection.

A carrier handle 70 is pivotally connected to the distal end of guard member 66 to further facilitate carrying of the apparatus and components held thereby by an individual.

Bottle securement straps 74, 76 are secured to stanchion 32 by brackets 78 and mechanical fasteners in the form of nuts and bolts, the bolts positioned in vertical slots of the stanchion to allow up and down movement of brackets 78 to adjust them to the desired locations before tightening the brackets into position. The straps 74, 76 may be formed of any suitable material, such as nylon webbing, and are adjustable to accommodate and tighten about air bottle 10. Rubber bumpers 80, 82 are attached to the stanchion by screws or other suitable mechanical fasteners and prevent the air bottle 10 from directly engaging the stanchion, thereby reducing scratching or other damage that could possibly occur due to such contact.

A stabilizer member 88 is attached to the stanchion to receive the top or valve end of the bottle incorporating the on/off valve of the bottle. The straps 74, 76 urge the bottle toward the stanchion so that the upper end of the bottle is firmly located in the recess 90 of the stabilizer member. Cover stripping 92 of plastic or the like is attached to the stabilizer member at the location of the recess and also where air line 16 passes the stabilizer member 88 from coupler 18 to reduce or prevent wear which otherwise might occur if direct contact was had with the stabilizer member.

A guard bracket 94 having a bumper 96 thereon is affixed to stabilizer member 88 and projects upwardly therefrom. A brace 98 extends between the stabilizer member and the guard bracket. The guard bracket and bumper afford protection for the coupler 18 and related components adjacent to the top of the air bottle.

The invention claimed is:

1. Apparatus for holding and transporting high pressure rescue air bag system components, said apparatus comprising, in combination:
   - a framework of rigid, unitary construction including a base member and an elongated stanchion attached to and extending upwardly from said base member;
   - deadman switch retainer means for releasably retaining the deadman switch of a high pressure rescue air bag system on said framework at a first location;
   - high pressure regulator and regulator gauge retainer means for releasably retaining the high pressure regulator and regulator gauge of a high pressure rescue air bag system on said framework at a second location; and
   - high pressure air bottle retainer means for releasably retaining the high pressure air bottle of a high pressure rescue air bag system on said framework at a third location.

2. The apparatus according to claim 1 wherein said deadman switch retainer means includes a receptacle attached to the framework having an open end for receiving the deadman switch of a high pressure rescue air bag system.

3. The apparatus according to claim 2 wherein said deadman switch retainer means additionally includes a deadman switch securement strap attached to said stanchion and disposed over said receptacle for engaging the deadman switch of a high pressure rescue air bag system projecting from the open end of the receptacle.

4. The apparatus according to claim 2 additionally comprising a magnet in said receptacle for holding tools.

5. The apparatus according to claim 4 additionally comprising a spacer within said receptacle for preventing engagement between said magnet and a deadman switch received by said receptacle.

6. The apparatus according to claim 1 wherein said high pressure regulator and regulator gauge retainer means includes a high pressure regulator securement strap attached to said stanchion for at least partially surrounding the high pressure regulator of a high pressure rescue air bag system and holding the high pressure regulator and regulator gauge in fixed position relative to and alongside said stanchion.

7. The apparatus according to claim 6 wherein said high pressure regulator and regulator gauge retainer means additionally includes a support member connected to said stanchion and projecting therefrom for positioning under the high pressure regulator of a high pressure rescue air bag system to support the high pressure regulator at a predetermined elevation above said base member.

8. The apparatus according to claim 7 additionally comprising adjustable connector means interconnecting said support member to said stanchion whereby the distance between said support member and said base member can be selectively varied.

9. The apparatus according to claim 6 additionally comprising adjustable connector means adjustably connecting said high pressure regulator securement strap to said stanchion.

10. The apparatus according to claim 1 additionally comprising a guard member attached to said stanchion and projecting therefrom over said base member, said guard member defining a guard member interior for accommodating the high pressure regulator and regulator gauge of a high pressure rescue air bag system when the high pressure regulator and regulator gauge are releasably retained by said regulator and regulator gauge retainer means.

11. The apparatus according to claim 10 wherein said guard member comprises a rigid band of material and wherein said apparatus additionally comprises adjustable attachment means adjustably attaching said rigid band of material to said stanchion to allow for selective positioning of said rigid band of material relative to said stanchion.

12. The apparatus according to claim 10 additionally comprising a carrier handle connected to said rigid band of material at a location spaced from said stanchion.

13. The apparatus according to claim 12 additionally comprising bumper elements attached to said rigid band of material and projecting outwardly therefrom.

14. The apparatus according to claim 1 additionally comprising a carrier handle attached to said stanchion at a location spaced from said support base at an upper end of said stanchion.

15. The apparatus according to claim 1 wherein said high pressure air bottle retainer means includes a bottle securement strap attached to said stanchion for extending at least partially about and engaging the high pressure air bottle of a high pressure rescue air bag system supported by said base member.

16. The apparatus according to claim 15 wherein said high pressure air bottle retainer means additionally includes a stabilizer member attached to said stanchion at an elevation above said base member and defining a recess for receiving the upper end of a high pressure air bottle supported by said base member and engaged by said bottle securement strap.

17. The apparatus according to claim 16 additionally comprising a guard bracket attached to said stabilizer member for protecting high pressure rescue air bag system components adjacent to the high pressure air bottle of a high pressure rescue air bag system held by said apparatus.

18. The apparatus according to claim 1 wherein said deadman switch retainer means and said high pressure regulator are disposed on a first side of said stanchion and said high pressure air bottle retainer means is disposed on a second side of said stanchion opposed to said first side.

19. The apparatus according to claim 1 additionally comprising light reflective material applied to selected portions of said apparatus.

20. The apparatus according to claim 1 wherein said stanchion has an upper distal end and additionally comprising a first handle attached to said upper distal end and a second handle spaced from said first handle.

* * * * *